United States Patent
Mazzei (10) Patent No.: US 6,730,214 B2
(45) Date of Patent: May 4, 2004

(54) SYSTEM AND APPARATUS FOR ACCELERATING MASS TRANSFER OF A GAS INTO A LIQUID

(76) Inventor: Angelo L. Mazzei, 11101 Mountain View Rd., Bakersfield, CA (US) 93307

(*) Notice: Subject to any disclaimer, the term of this patent is extended or adjusted under 35 U.S.C. 154(b) by 0 days.

(21) Appl. No.: 10/015,044

(22) Filed: Oct. 26, 2001

(65) Prior Publication Data

US 2003/0080037 A1 May 1, 2003

(51) Int. Cl.[7] .............................................. B01D 19/00
(52) U.S. Cl. ........................ 210/188; 95/261; 96/195; 96/208; 210/750; 261/76; 261/117; 366/162.4; 366/163.2; 366/336
(58) Field of Search .......................... 366/163.2, 162.4, 366/336, 337, 338, 339; 261/117, 76; 95/241, 261; 96/195, 155, 208, 209, 212, 216; 210/188, 750

(56) References Cited

U.S. PATENT DOCUMENTS

| | | | | |
|---|---|---|---|---|
| 2,426,833 A | * | 9/1947 | Lloyd | |
| 3,770,249 A | * | 11/1973 | Schmitt | |
| 3,833,718 A | * | 9/1974 | Reed et al. | |
| 4,123,800 A | | 10/1978 | Mazzei | |
| 4,255,124 A | * | 3/1981 | Baranowski, Jr. | |
| 4,766,001 A | * | 8/1988 | Mizandjian et al. | |
| 5,064,449 A | * | 11/1991 | Ford et al. | |
| 5,314,613 A | * | 5/1994 | Russo | |
| 5,338,341 A | * | 8/1994 | Mazzei et al. | |
| 5,403,475 A | * | 4/1995 | Allen | |
| 5,423,979 A | * | 6/1995 | Allen | |
| 5,433,866 A | * | 7/1995 | Hoppe et al. | |
| 5,494,576 A | * | 2/1996 | Hoppe et al. | |
| 5,622,545 A | | 4/1997 | Mazzei et al. | |
| 5,674,312 A | | 10/1997 | Mazzei | |
| 5,762,687 A | * | 6/1998 | Grossmann | |
| 5,863,128 A | | 1/1999 | Mazzei | |
| 5,894,995 A | | 4/1999 | Mazzei | |
| 5,927,852 A | * | 7/1999 | Serafin | |
| 5,951,922 A | * | 9/1999 | Mazzei | |
| 6,083,385 A | * | 7/2000 | Benskin et al. | |
| 6,193,893 B1 | | 2/2001 | Mazzei et al. | |

OTHER PUBLICATIONS

Komax Mixing Systems Inc.—Advertising sheet entitled Triple Action Static Mixers.
Komax Mixing Systems Inc.—Bulletin 103B entitled Komax Triple Action Motionless Mixers.

* cited by examiner

Primary Examiner—Duane S. Smith
(74) Attorney, Agent, or Firm—Donald D. Mon (57) ABSTRACT

System and apparatus to accelerate solution of gas into liquid. The system includes an aspirating injector to bring the gas into the pressurized system, a collider, a reactor, and an optional gas/liquid separator. The collider and reactor provide for prompt renewal of the interface in the bubble with the liquid as the consequence of abrupt changes of direction of flow.

20 Claims, 7 Drawing Sheets

SYSTEM AND APPARATUS FOR ACCELERATING MASS TRANSFER OF A GAS INTO A LIQUID

FIELD OF THE INVENTION

Accelerating the solution and equilibrium of gases injected into a liquid, such as air, oxygen, ozone or chlorine in the treatment of liquids, for example water.

BACKGROUND OF THE INVENTION

Infusion of gases into a flowing stream of liquid is commonplace in many industries. Perhaps the best-known example is treatment of water with ozone, oxygen, air, or other gases for purification purposes. There are many techniques to accomplish this, all of which involve presenting the gas to the liquid at a liquid/gas interface so the gas (or some of it) will dissolve in the liquid, passing across the interface.

There are several most frequently encountered techniques for creating the interface. One example is to spray the water into air so the surfaces of the liquid droplets form the interface. Another is to pour the liquid over extended surfaces such as Raschig rings to spread out the surface of the water to form an extended interface. Another is the injection of bubbles into a body of water. This technique can be accomplished simply by bubbling gas through the water, or as more pertinent to this invention by injecting the gas into a pressurized closed flowing stream of water with the use of an aspirating injector.

In the latter two techniques—bubbling and injecting, the interface is the concave boundary of the gas bubbles, rather than the flat or convex exposed surface of the water. The transfer of the gas into the liquid requires its passage across the interface formed by the gas trapped in the bubbles. Although there are other pertinent parameters, those of most importance are the surface area of the bubbles and the system pressure.

It is well-known that a large number of smaller bubbles will have a larger total interface area than a single large bubble containing the same total volume of gas. It follows that the rate of transfer of a given volume of gas will be accelerated by reduction of the size of the bubbles, considering equal volumes of gas.

Also, the solubility of a gas in a liquid is a direct function of the pressure (Henry's Law). More gas will be dissolved in a given liquid at a higher pressure (at the same temperature) than the same gas at a lower pressure.

Another parameter, which is more related to dynamics than to pressure and area at the interface is the partial pressure and the concentration of the gas intended to be transferred at the interface. For example, when air is injected the gas desired to be transferred is oxygen, rather than nitrogen and the other constituents of air. Their rates of transfer may not be equal, and it is possible that the concentration of oxygen at the interface may be lower than the concentration farther away from it. While the effect may be small for each bubble, in this invention many thousands of small bubbles are contemplated and even minor differences can provide major effects.

Because in some applications there may even be an exchange of gases from the water into the bubbles and vice versa, any means to accelerate the transfer is a welcome improvement. In conventional installations, it is common practice simply to employ enough volume of apparatus to provide time for the interchange to occur. This frequently necessitates the use of large tanks and towers, or large conduitry. These are expensive in themselves and require substantial "real estate" to accommodate them in major systems.

Instead of the above, or in addition to it, apparatus is known to stir or otherwise mix the gas and liquid. For example, static mixers are known which function to cause internal movement in the fluid stream with the objective of providing a uniform "availability" of the gas bubbles and liquids, thereby to assure a uniformity of fluid in the system, avoiding voids and pockets, and local concentrations.

Such static mixers ordinarily redirect the stream or portions of it to change a smooth stream into a path with cross-currents, orbital currents, and the like. In some, downstream-directed stream converge into one another as they flow through the mixer. Their objective is to mix the components of the stream to approach uniformity and eliminate regions of greater or lesser concentration. They are as useful in blending syrups as in mixing liquids and gases.

However, that is not the objective of this invention. Instead, this invention is directed toward the vigorous and rapid continuing renewal of the interface conditions between the bubble and the surrounding liquid. The objectives are very different from those of the static mixer.

It is further useful to emphasize that the stream in this system, while closed and under pressure is not incompressible. In fact it is compressible, and in a sense elastic. This is because of its substantial gas content which often may be as high, volummetrically, as 20%. The liquid is, of course not compressible, but because of the gas, the combined stream is. Therefore changes in pressure, physical forces such as abrupt accelerations, impacts and reversals, result in important changes in the shape and size of the bubbles. The consequence is that the composition at the interface of the gas bubble with the liquid is being constantly renewed.

While neither the reactor nor the collider has any moving parts, it is not a static mixer in the conventional sense. The exercise of this stream is far from orderly. Its abrupt reversals, eddy regions and internal nozzles and joggles, all combine to cause this compressible stream to undergo physical reactions that profoundly accelerate the solution of the gas into the liquid.

The applicant has discovered that the rapid renewal of the interfaces and of the gas concentration directly contiguous to this interface has an extraordinary cumulative effect on the transfer of gases. He has also discovered that a most appropriate way to accomplish this is by the "exercising" of the gas bubbles, for example by abrupt changes in direction of the stream, of passing the stream through sequential orifices, and of colliding streams of bubble-containing liquid. These techniques can be used singly or in any combination. Such exercise of the bubbles results in a surprisingly effective and very rapid solution and equilibrium of the gas.

This invention overcomes the disadvantages of the prior art by including in a flowing system under pressure, a collider or a reactor of surprisingly small bulk, or both, located downstream from an aspirator injector. For some applications this may advantageously be followed by an optional gas separator to remove undissolved excess gas.

This invention provides an optimum system which provides surprisingly beneficial results. However, there are many applications where ultimate performance is unnecessary. In this, an installation of lesser complexity and bulk can provide a myriad of small bubbles of gas to be dissolved and treated with sufficiently acceptable results.

The reader is entitled to ask why there is an advantage in accelerating a process which, if given enough time would occur anyway. The answer is that for a given volume of liquid and desired attained result it is possible to reduce the bulk and footprint of the system (and thereby its cost), and to reduce the dwell time of the liquid during treatment.

There is the additional advantage that the system need not be "over-dosed" in order to be certain that sufficient gas is available, and then requiring the stripping off a large excess quantity of treatment gas.

The rapid renewal and abrupt changes of the interfaces caused by the fluid manipulations of this invention result in a surprising reduction in dwell time and bulk of the process equipment. When the preferred embodiment of the system is utilized, the dwell time can often be reduced by as much as 60%, with an attendant reduction of required real estate and investment, compared to known systems.

BRIEF DESCRIPTION OF THE INVENTION

The presently preferred embodiment of the invention receives liquid under pressure to be treated by an injected gas. The liquid flows into an aspirator injector which injects the gas into the liquid. From the injector, the flow is to a collider and a reactor, in either order, in which the stream is subjected to vigorous exercising including abrupt changes in motion rapidly to renew the gas/liquid interfaces.

From these (or from either one if only one is used) the stream is discharge, preferably through a centrifugal gas/liquid separator.

According to a preferred but optional feature of the invention, the collider provides for two colliding stream which create the vigorous action.

According to yet another preferred but optional feature of the invention, the reactor includes a cylinder having an upstream chamber and a downstream chamber with a partial barrier between them. An inlet nozzle directs a strong stream against a reflector surface on the barrier, which reverses the direction of flow in the chamber to a cove surface that again abruptly reflects the stream. The stream flows through joggle slots into the downstream chamber where it preferably strikes a cove surface that reflects the stream to a downstream facing reflecting surface, from which the stream resumes its flow toward the separator.

The above and other features of this invention will be fully understood from the following detailed description and the accompanying drawings, in which:

DETAILED DESCRIPTION OF THE INVENTION

Figure 1:
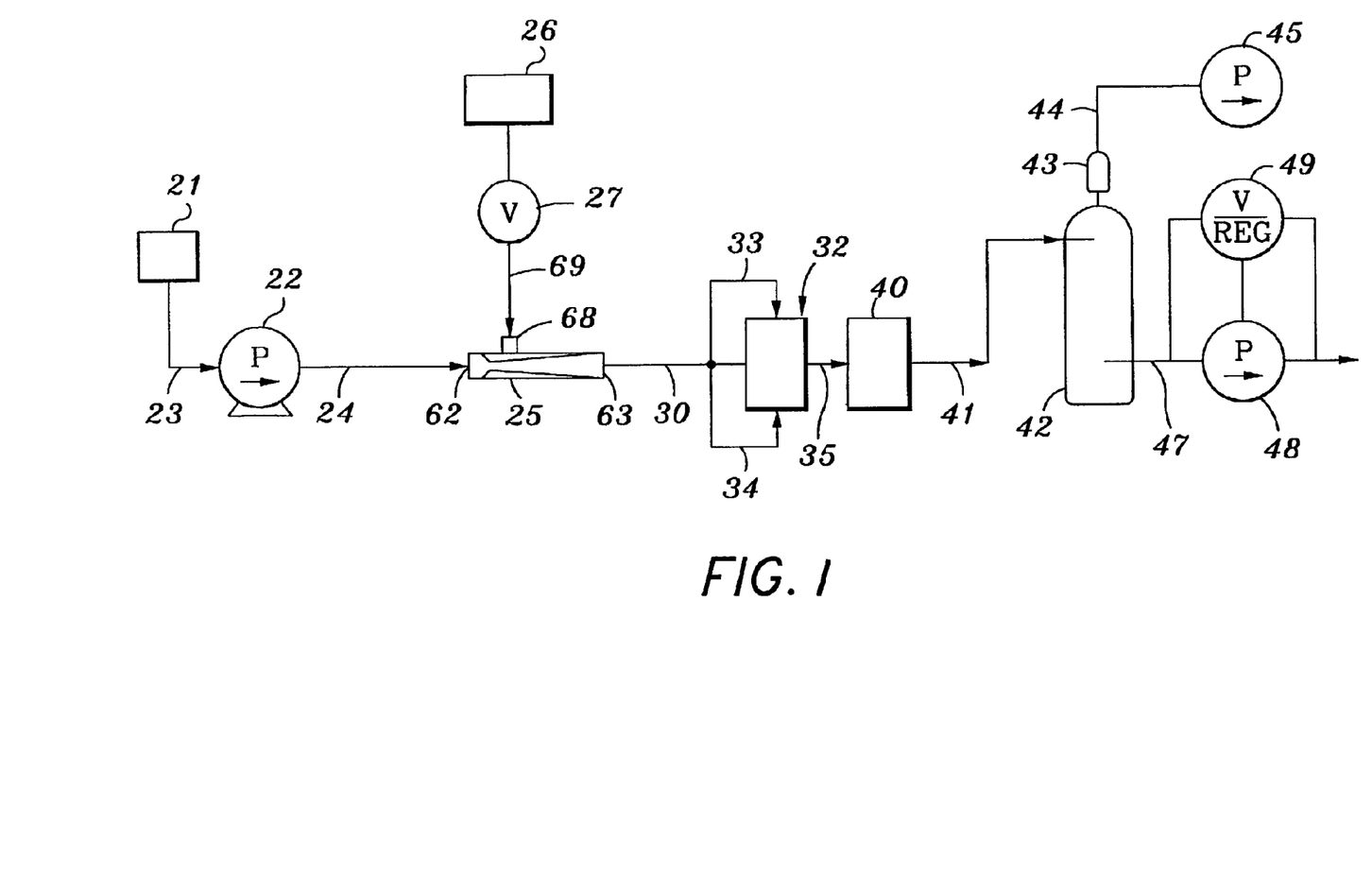
FIG. 1 is a schematic drawing showing the preferred circuit of this invention.

The presently preferred system 20 according to the invention is shown in FIG. 1. This is the optimum system, which offers all of the advantages of the invention. As will later be apparent, parts of it may be modified or eliminated, in order to adjust the performance of one of the components or to accept a lesser performance of the system. In the latter event, the lesser performance may be sufficient for the intended application, and the reduced cost of the eliminated component is attractive.

Systems according to this invention are capital expenses, often paid with tax dollars. Reduction in costs for equivalent performance often lead to granted contracts. It is a substantial advantage that this system can use all or less than all of its components, and in every situation will provide equivalent or better performance for less equipment cost, and with less real estate to accommodate it, than presently-known systems used for the same purposes.

The system is adapted to accept and to treat a liquid such as water from a source 21. Source 21 may be such as a reservoir, a tank, a sump, a lake, or some other storage means for the liquid intended to be treated. The most common use for this system will be the treatment of water with a treatment gas, for example to sanitize it for domestic purposes, or to reduce a contaminant so the stream can be discharged into the environment, perhaps into a sewer or a river.

The water must be treated under pressure. Accordingly, a pump 22 receives liquid from the source through conduit 23 and impels it through conduit 24 to an aspirating injector 25.

It is the function of injector 25 to aspirate into the stream a treatment gas from a gas source 26 into the stream in a myriad of small gas bubbles. A regulator valve 27 is optionally placed between the injector and the gas source 26.

Conduit 24 receives the bubble-laden stream from the injector, and conveys it to a collider 32 through two branches 33, 34. As will later be shown, these inject the stream into the collider, from which, recombined, it exits the collider through a conduit 35.

In turn, conduit 35 conveys the stream to a reactor 40. A conduit 41 conveys the stream from the reactor to a separator 42, which functions to strip undissolved or entrained gas from the liquid. A gas vent 43 relieves gases from the separator, and discharges it to a point of disposal through conduit 44. Under some circumstances a vacuum pump 45 may be connected to conduit 44.

Water stripped of residual gases exits the separator through conduit 47. System pressure may be further regulated and maintained by a pump 48 under control of a pressure regulator loop 49.

The term "fluid release" is sometimes used herein to denote structure which will enable the liquid to leave the system while still maintaining system pressure. This may include the separator and its downstream valving, or if the separator is not used, then only valving.

The foregoing is a description of the most complete system. The individual components will now be described, and some will be claimed individually as such.

Figures 2, 3, 4:
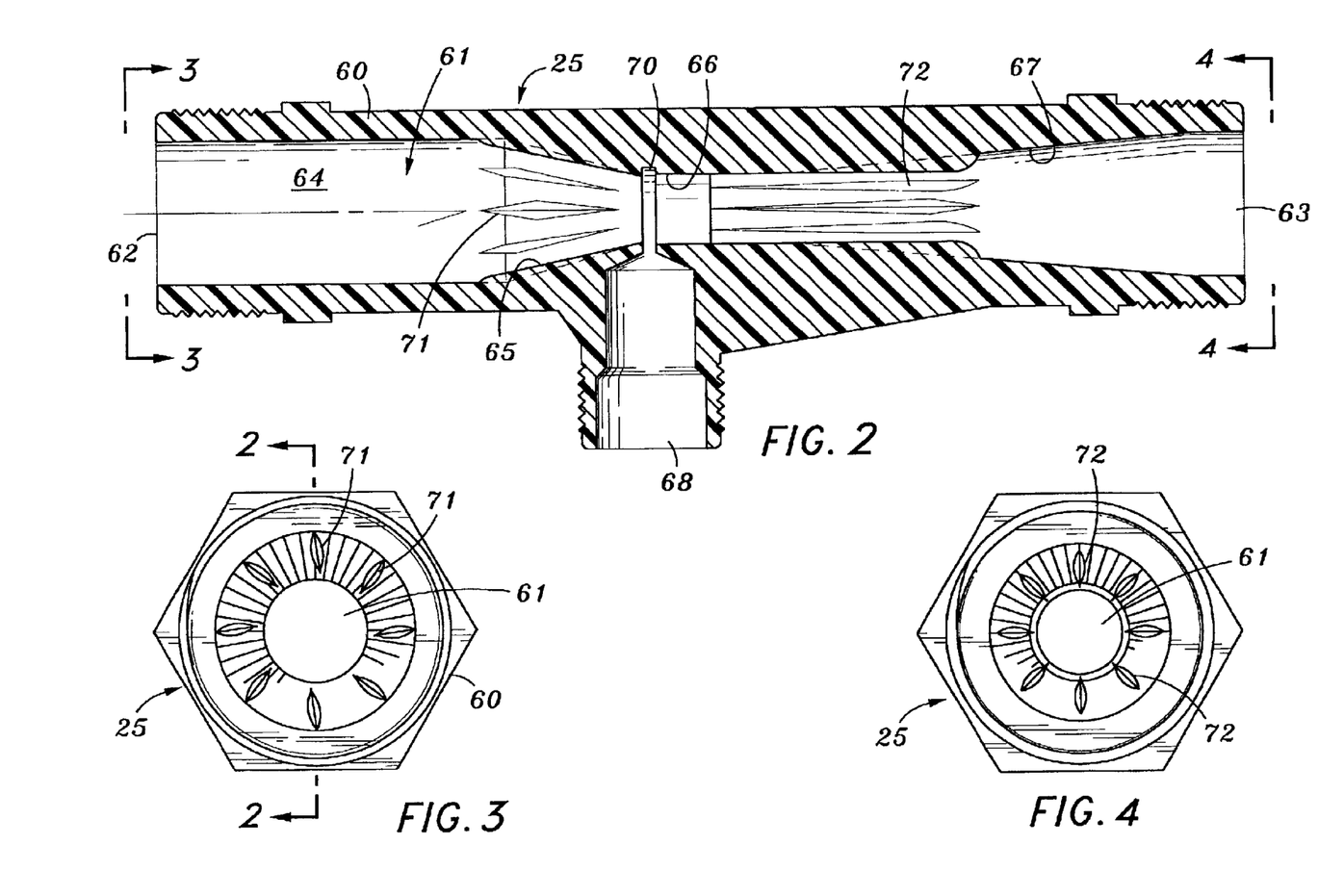
FIG. 2 is an axial cross-section of the preferred embodiment of injector.
FIG. 3 is an end view taken at line 3—3 in FIG. 2.
FIG. 4 is an end view taken at line 4—4 in FIG. 2.

The presently-preferred form of injector 25 to be used in this system is shown in FIGS. 2–4. It is a member of the class of aspirating injectors shown in U.S. Pat. Nos. 4,123,800 and 5,863,128, issued to Angelo L. Mazzei. The latter one is illustrated in FIGS. 2–4, although the simpler embodiment shown in the former patent is also useful in the invention. Both of these patents are incorporated herein and made a part hereof by reference in their entirety for their showing of the details of construction of useful injectors. In particular the reader is referred to U.S. Pat. No. 5,863,128 for a complete discussion of its features. FIGS. 2–4 show injector 25. Such injectors can be purchased from Mazzei Injector Corporation at 11101 Mountain View Road, Bakersfield, Calif. 93307.

Known systems utilizing such an injector and a separator are shown in U.S. Pat. No. 5,674,312 issued to Angelo L. Mazzei and U.S. Pat. No. 6,193,893 issued to Angelo L. Mazzei and Raymond M. Meyer. Both of these patents are incorporated herein and made a part hereof by reference for their showing of systems that utilize both an injector and a separator, and their teaching of the management of such systems.

A body 60 has an axial central passage 61 extending from inlet end 62 to outlet end 63. Conduit 24 is connected to inlet end 62. Conduit 30 is connected to outlet end 63.

The passage is circular. An inlet section 64 is followed in the downstream direction by a converging section 65, a substantially cylindrical throat section 66, and an expanding section 67 in that order.

Supply port 68 is connected to conduit 69, and enters into a circular groove 70 through which treatment gases are injected into the throat section. Groove 70 (or injection ports instead) are preferably located close to the end of the converging section.

Twisting vanes 71 are formed in the converging section. Straightening vanes 72 are formed in the diverging section. These project into the stream to the limited extent described in U.S. Pat. No. 5,863,128. Twisting vanes 71 give a small circular "twist" to the outer boundary of the stream. Straightening vanes 72 remove some of this twist. These vanes are optional. With the loss of only some advantage, injectors without them will also function well. U.S. Pat. No. 4,123,800 illustrates such an injector.

The effluent stream from the injector is liquid which includes within it a myriad of small bubbles of the treatment gas received from source 26 (atmosphere, tank, compressor). The stream, having been reasonably well mixed, is dispatched by system pressure to collider 32. The collider is the first of two devices which "exercise" the stream flow, and thereby also the bubbles, their contents, and their interfaces.

The preferred embodiment of collider 32 is shown in FIGS. 5–8. The collider comprises a body 81 forming a closed internal chamber 82, with a pair of end walls 83, 84. The wall 85 between them is preferably cylindrical. Exit port 86 departs from the chamber at a right angle to the central axis 87 of the cylinder wall.

Figures 5, 6:
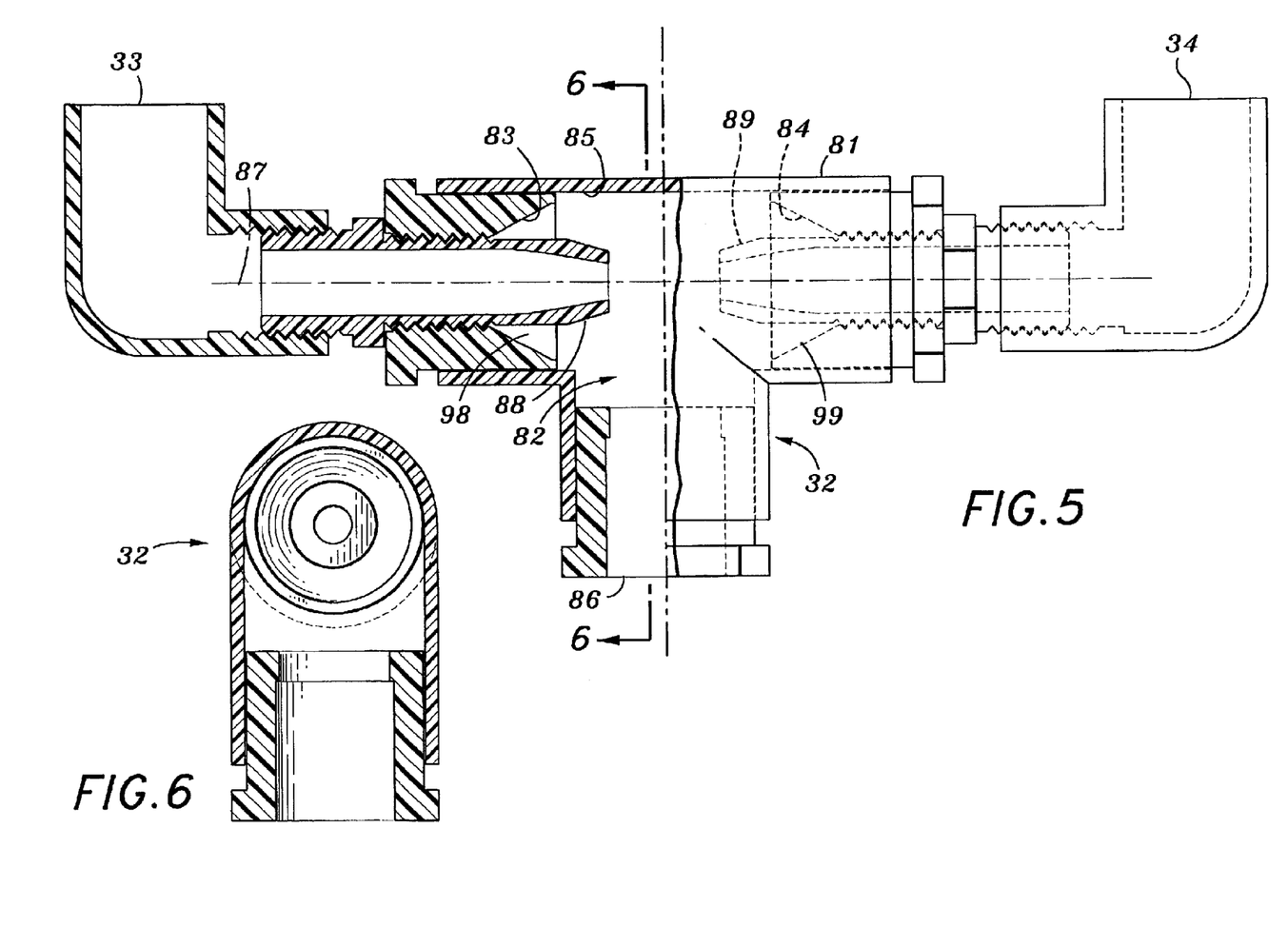
FIG. 5 is a side view, partly in cutaway cross-section and partly in phantom line of the preferred collider.
FIG. 6 is a cross-section taken at line 6—6 in FIG. 5.

Nozzles 88, 89 an respectively connected to branches 33 and 34. They are placed on axis 87, and are directed into the chamber. In the arrangement shown, which usually will be preferred, they are axially pointed directly at each other.

Instead of being axially aligned and directly opposed, these nozzles may be pointed with their streams intersecting and forming between them an angle greater than zero degrees, and not greater than about 90 degrees. Then the streams will not axially collide, but instead will collide obliquely, so as to provide impulse to movement of the fluid in a non-symmetrical manner.

Figure 7:
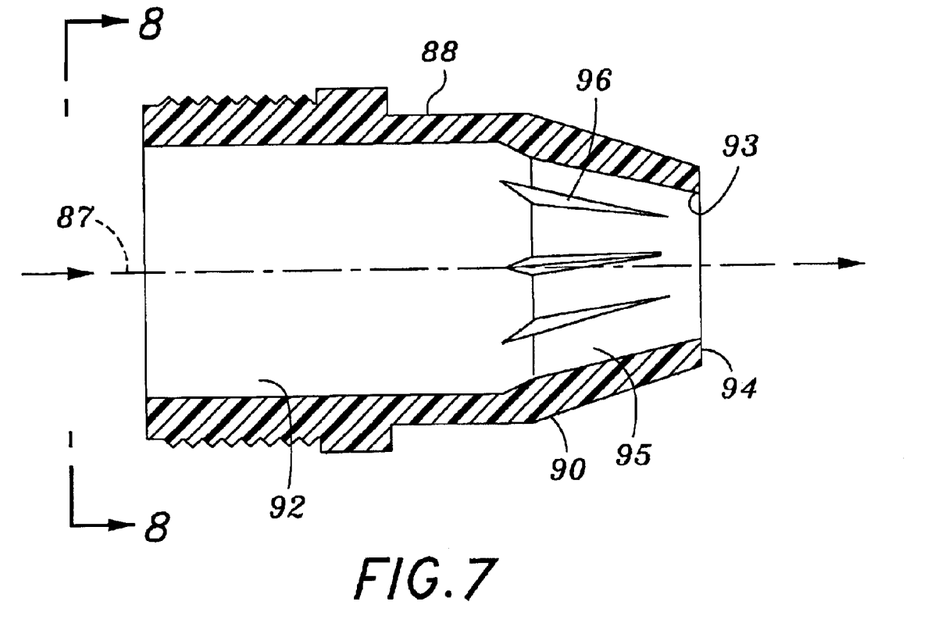
FIG. 7 is a cross-section of the preferred nozzle for use in FIG. 5, a simplified nozzle being shown in FIG. 5.
Figure 8:
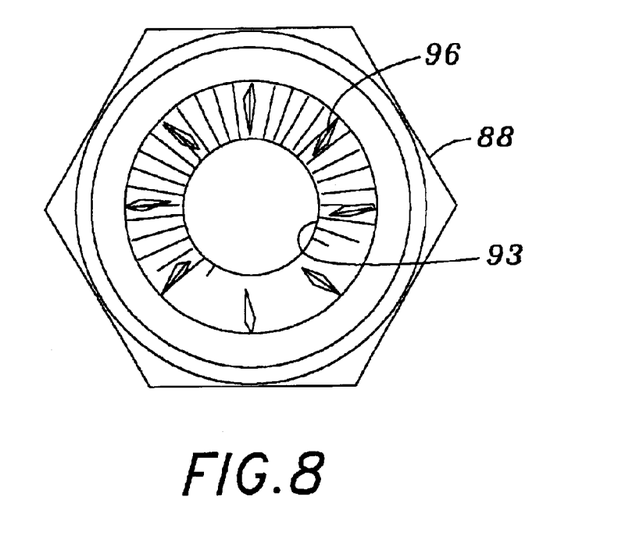
FIG. 8 is an end view taken at line 8—8 in FIG. 7.

Nozzles 88 and 89 may if desired be simple converging types with converging surfaces just before their exit ports. Such simple nozzles may be used with considerable effect in this system. However, it has been found that utilizing the nozzles shown in U.S. Pat. No. 5,863,128 issued to Angelo L. Mazzei, provides an improvement to the function of the basic collider. As best shown in FIGS. 6–8, the preferred nozzle comprises a body 90. This body is essentially the same as the inlet and converging sections of the injector. It includes an inlet section 92 connected to conduit 33 or 34. The body is mounted to a respective end wall of the collider. The nozzle has a central orifice 93 at its outlet end 94, directing its stream into the chamber.

In the preferred embodiment, the converging section has, on its surface 95 a plurality of twisting vanes 96, which provide rotation to a limited outer portion of the flowing stream. Full discussion of this feature will be found in U.S. Pat. No. 5,894,995, issued to Angelo L. Mazzei, which patent is incorporated herein and made a part hereof by reference for its showing of the construction and theory of a nozzle of this type. The vanes are not necessary to this system, but they do assist in creating movements of fluid in the chamber.

Attention is called to regions 98, 99 in the chamber, to the side of the nozzles. These are regions in which liquid eddies, rather as in a pocket, subsidiary to the major flow resulting from the collision of the streams, and their exit out the exit port. These eddy current regions provide, for some of the liquid, an increased dwell time that enables still more rapid solution of the gases.

The dimensions of the collider are arbitrary. The important relationship is for the directed flow patterns of the nozzles to intersect one another, preferably directly on, but in some applications, at an included angle between them of not more than about 90 degrees. The intended and effective result is attained as the consequence of the collisions of the streams, which cause rapid changes of direction and shape of the bubbles, and secondarily, time spent in eddies in some regions of the collider. The benefits of the nozzle, which has important advantages when used to inject a liquid into a body of the liquid, are described in the said U.S. Pat. No. 5,894,995 to Mazzei. It should be remembered that this system is filled with fluid (both gas and liquid), all of which is under pressure.

Figure 9:
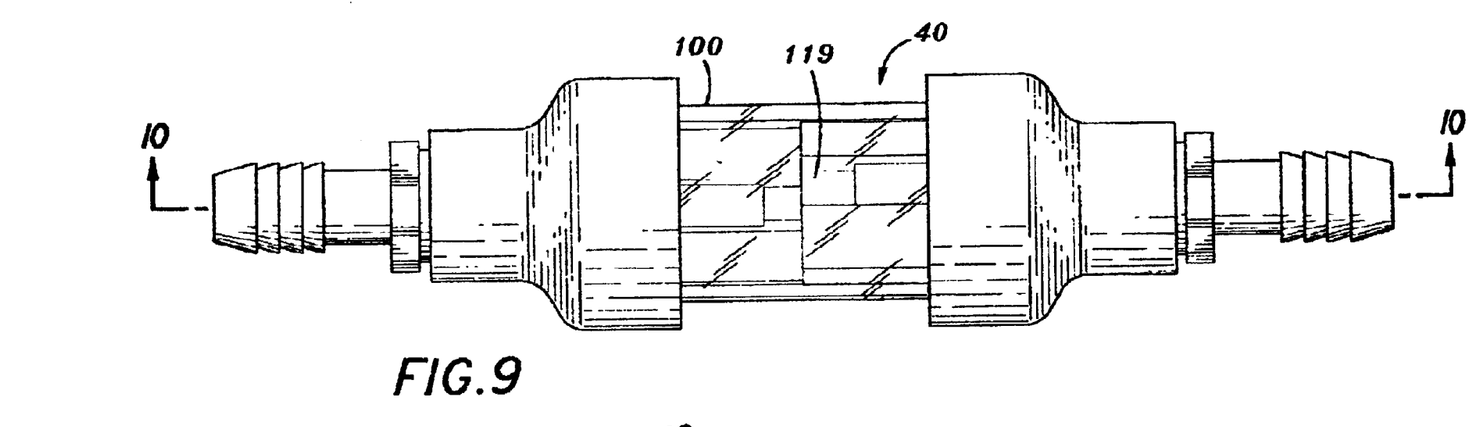
FIG. 9 is a side view of the presently preferred reactor.

Reactor 40 is a more complicated structure. In a relatively short structural length it provides a mean path that is not only significantly longer than its structure, but provides a quite complex path with many excursions from a straight-through path, leading to collisions with structure and with other currents in a complicated stream. The structure itself is rather straight-forward, and readily molded to shape.

Figure 10:
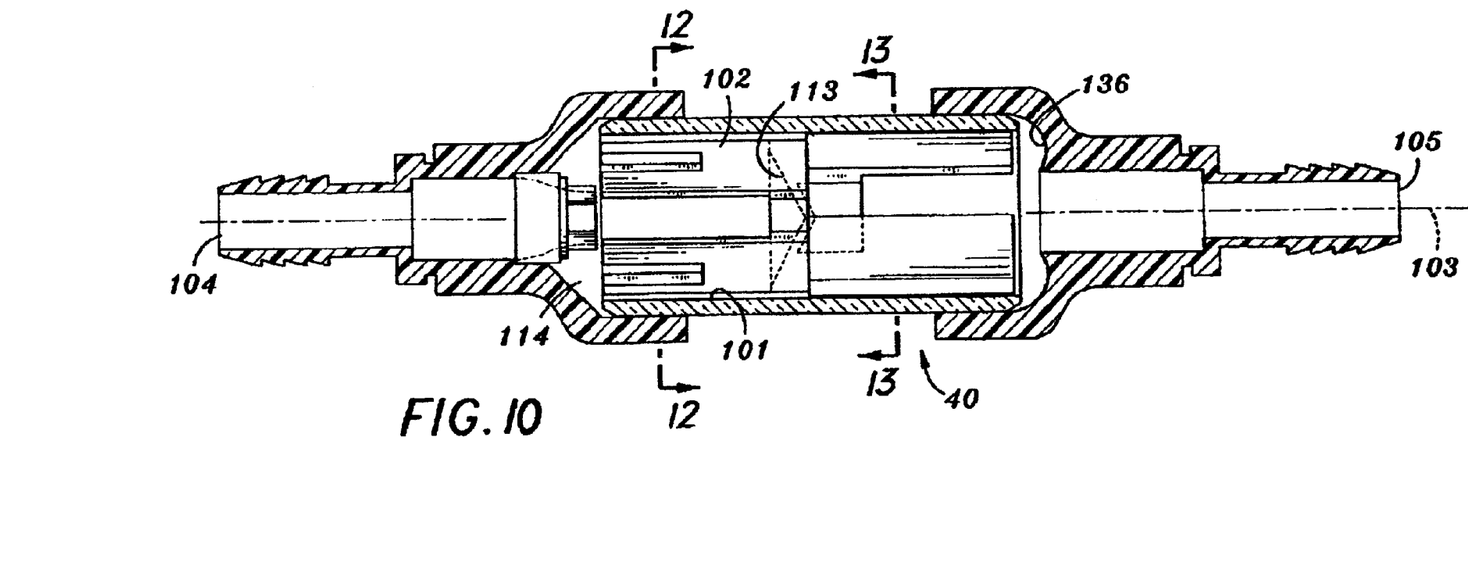
FIG. 10 is a cross-section taken at line 10—10 in FIG. 9.

Reactor 40 comprises a body 100 having a cylindrical inner wall 101 forming a cylinder 102 with a central axis 103. An axial inlet port 104 receives the stream from conduit 35. An axial outlet port 105 discharges the stream to conduit 41.

A nozzle 106 in the inlet port is preferably a converging type nozzle that forms a concentrated, nearly cylindrical stream directed axially into the chamber.

A partial barrier 110 extends laterally across the chamber. It is "partial" because some flow patterns are permitted past it. In its central area, it acts as a barrier that is also a reflector of at least part of the stream. Because of its complexity the barrier is most conveniently formed in a mold, at least for sizes up to about 3 inches in diameter.

It divides the internal cylinder into a first chamber 111 and a second chamber 112. Chamber 111 is upstream and in communication with the nozzle. Chamber 112 is downstream and communication with the outlet port. Gross flow is from the inlet port to the outlet port, and it all must pass the barrier. The barrier includes an upstream-facing reflecting surface 113, which is directly aligned with the nozzle so as to receive and reflect at least the major portion of its stream. It should be remembered that this reactor is filled with fluid in many modes of motion, so that, while much of the nozzle discharge directly impacts surface 113, a significant part of it will become involved with other flow patterns.

The reflecting surface is preferably concave, so that, when the nozzle discharge strikes it as a stream, the reflected stream flares outwardly as it returns in a generally upstream direction. This returning flow in turn strikes a circular cove 114 adjacent to the nozzle, from which it is returned in a downstream direction. Thus, this far the stream has undergone two reversals of direction, both abrupt. In addition, there are intersections of various parts of the general stream—for example the intersection of part of the nozzle stream with the reflected stream, the interaction of the reflected stream with the cove, and its reflected stream with the first reflected stream.

Figure 11:
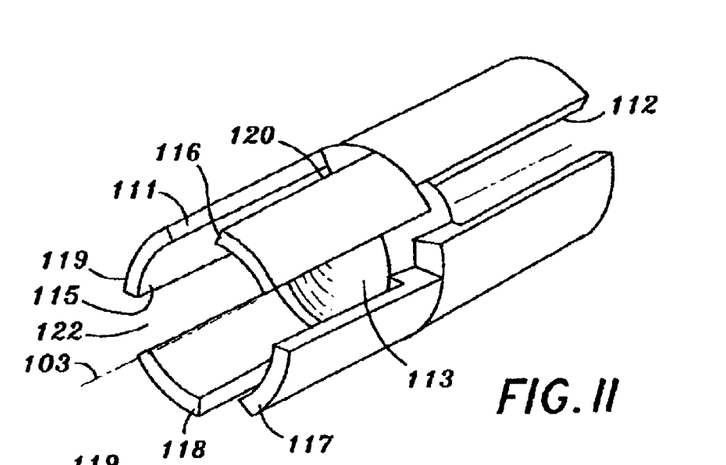
FIG. 11 is an oblique view of a portion of the reactor of FIG. 9 removed for purposes of illustration.
Figure 12:
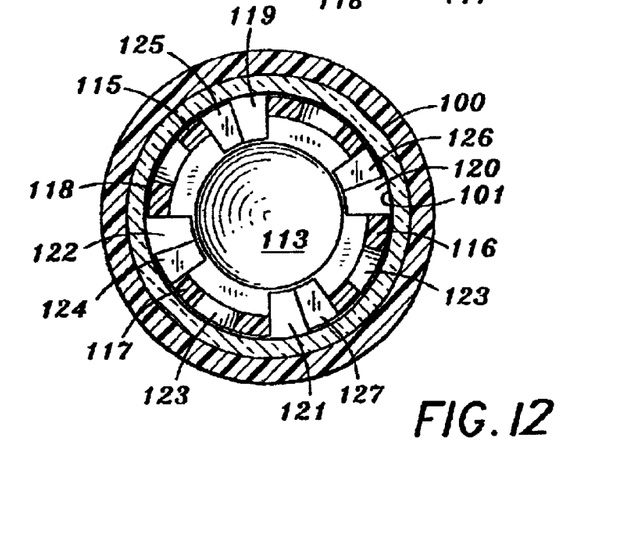
FIG. 12 is a cross-section taken at line 12—12 in FIG. 10.

The barrier further includes a plurality of axially extending arcuate blades 115, 116, 117, 118. These blades are angularly spaced from one another so as to provide slots 119, 120, 121 and 122 between them. The reflecting surface includes an annular surface 123 between the blades and the impingement surface. This provides yet another surface on which downstream-directed fluid can strike. It is continuous at the blades, but is pierced by the slots. It provides not only for impact, but also for compression of the stream, especially as the stream that strikes between the slot moves laterally to join fluid that flows directly into the slot and through a relieved portion 125. While some of the stream might flow directly from the nozzle to these relieved portions (the shortest possible path), the great preponderance of the flow will experience at least three impacts, plus an indeterminate number of mixings with intersecting currents or eddies. Especially at the upstream end of the first chamber around its edge there is a region likely to produce eddy currents for still more mixing.

The gross stream passes into the second (downstream) chamber 112. In its preferred embodiment, the downstream chamber subjects the flow to further mixing and abrupt reversal. In some embodiments, this will not be necessary because flow patterns in the first (upstream) chamber will have been sufficient. In that event, the downstream chamber may be formed as a simple funnel (not shown), discharging to conduit 41.

Figure 13:
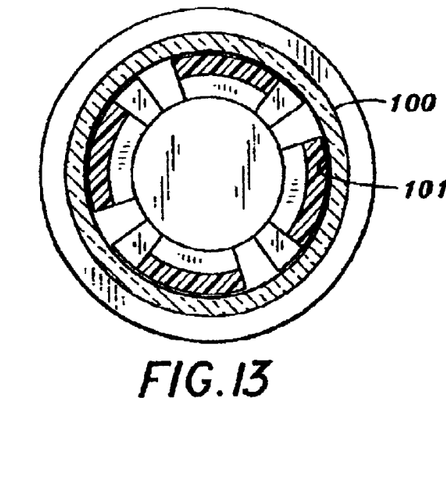
FIG. 13 is a cross section taken at line 13—13 in FIG. 10.

Joggle surfaces 124, 125, 126 and 127 are formed by upstream ends of blades 128, 129, 130 and 131. Slots 132, 133, 134 and 135 are formed between these blades in the downstream chamber. They extend to a cove surface 136. As can be seen, a portion of the flow through the slots can be straight-through, but part of it encounter the joggles. These joggles direct a portion of the stream into the direct stream through the direct path between the slots creating still another mixing of the liquid and the bubbles.

The joggles preferably "blank" about one half of the width of the slots, so that portion of the stream is diverted into the remainder which passes straight through. This not only causes another violent mixing, but also forms restrictions in the nature of nozzles which accelerate the flow and locally reduce the pressure. This is a further "exercising" of the bubbles. The total areas of the open aperture at the joggles should about equal the cross-section area of the nozzle inlet, although this is not a limiting value.

On the downstream side of the barrier there is a reflecting surface which reflects the stream from the cove to the outlet port. Surface 137 may be concave or flat as desired. The reflective and edging flow resemble those in the upstream chamber.

Reactor 40 thereby provides in a comparatively small and short device the equivalent of long conduits or large tanks. In fact, a 3 inch long reactor with about 1½ inch internal diameter has been found to be the equivalent of a 400 gallon tank, which usually must be built from stainless steel. The savings in equipment cost and of real estate are real and are dramatic.

When the stream leaves reactor 40, it will have received the intended benefits of this invention. At this point, the stream may be discharged from the system, with both the liquid (with dissolved gas) and entrained gas (as bubbles). The pressure in the system must be maintained, so the exit will be through a controlled release such as a pressure regulator that permits escape of fluid, but without reducing the system pressure.

However, the effluent would be rather effervescent, and also perhaps the entrained gases would objected to. For example, if ozone or chlorine were used in excess for treatment, the bubbles would need to be removed, and the gases recirculated or otherwise disposed of.

Figure 14:
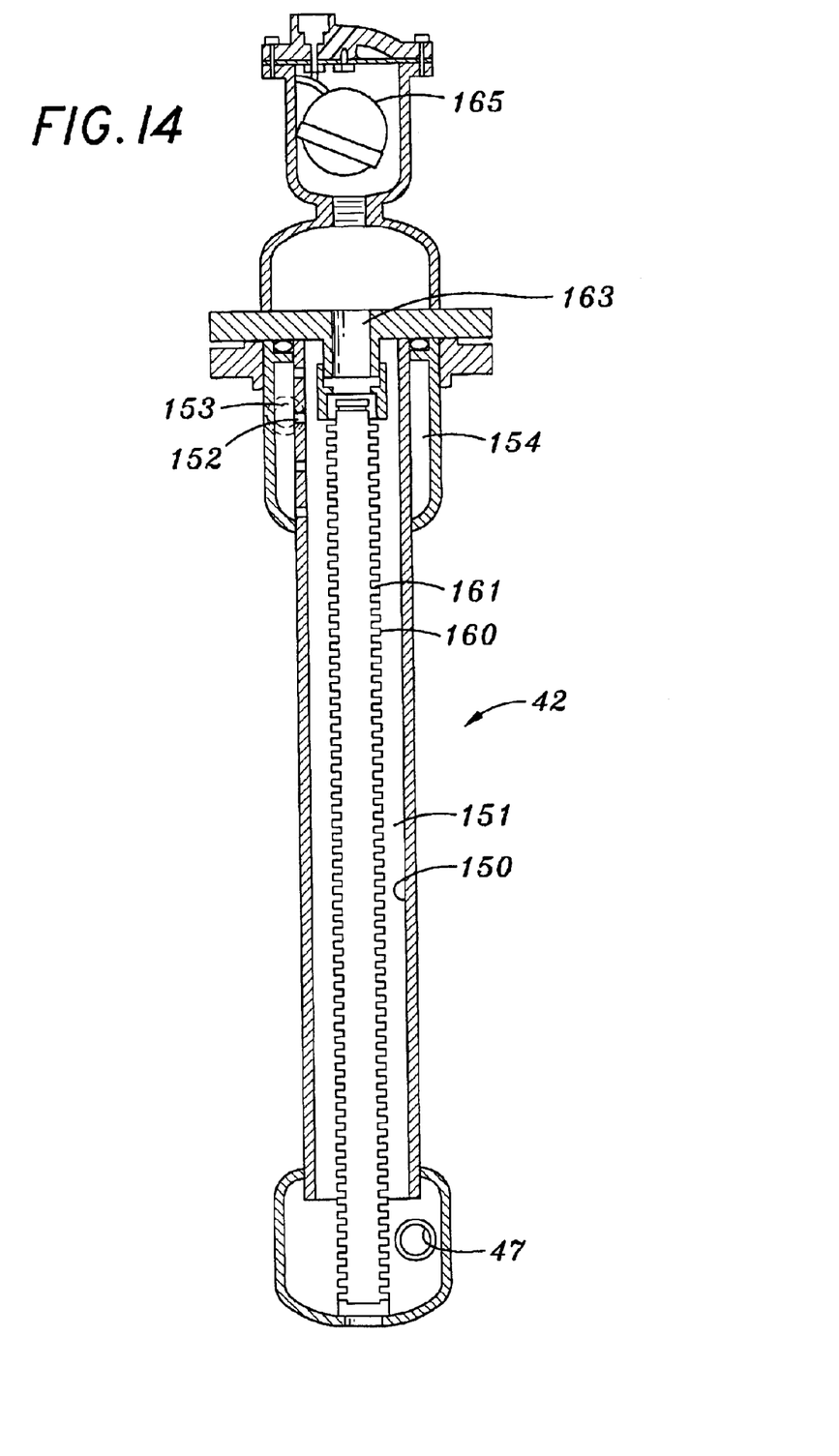
FIG. 14 is an axial cross-section of a centrifugal separator useful in the system of FIG. 1.

An optimum gas separator is shown in FIG. 14. It requires no separate power supply, and operates solely on system pressure. It is a centrifugal separator of the type shown in U.S. Pat. No. 5,622,545 issued to Angelo L. Mazzei and Steven D. Ford. This patent is incorporated herein in its entirety by reference for its showing. Full details of construction, theory and operation of such a separator can be obtained from a reading of this patent.

Separator 42 includes a cylindrical vortex tube 150 that forms a centrifuge chamber 151. Its upper wall is pierced by injector ports 152 that convey the stream under pressure from nozzles 153 through a cuff-like supply chamber 154 to provide a rapidly swirling flow around and down the vortex tube. The heavier liquid will segregate to the wall, and the gas will segregate near the axis.

A separator tube 160 extends down the center of the vortex tube. It has slots 161 that permit the gases to flow into the tube and up through exit port 162. Liquid flows out the bottom through exit port 163.

Above the exit port is a gas relief valve 165. This valve is responsive to the interface between liquid and gas, and will open to release gas if the liquid level in the separator chamber is too low.

The system described to this point incorporates all of the potential advantages of the invention. However, all features will not always be needed. For example, if it is agreeable to flash the residual gases into the atmosphere no separator will be needed. Also, other types of separators may instead be used, including settling tanks, for example.

In many systems, either of the collider or reactor may be used without the other, and when both are used, their order in the system can be reversed. Whatever the arrangement, it will include an aspirating injector for the system.

The collider and reactor are unique in their own right, and do not require an injector to provide advantages of accelerating solution of gases, although the combination is beneficial. Persons skilled in the art will recognize other uses for these unique devices.

This invention thereby provides a unique system to accelerate the solution of gases, and unique individual pieces of apparatus (the collider and reactor) with benefits of their own.

This invention is not to be limited by the embodiment shown in the drawings and described in the description, which is given by way of example and not of limitation, but only in accordance with the scope of the appended claims.

I claim:

1. A system for accelerating the solution of treatment gas into a liquid stream, said system being adapted to receive and maintain said stream under pressure, said system comprising:

an aspirating injector comprising a body having an axial passage, a converging section, a throat section and a diverging section in said passage in that order, an injector port through said body entering said throat section and adapted to receive treatment gas to be dissolved in said liquid stream, said passage having an inlet port to receive said stream, and an outlet port;

a collider and a reactor, each having an inlet port and an outlet port, the inlet port of one of them being connected to the outlet port of the injector, its outlet port connected to the inlet port of the other and; a fluid release receiving said stream from said last mentioned outlet port for releasing the treated stream from the system while maintaining the system under pressure:

said collider comprising a body forming a chamber, a pair of nozzles opposing one another, said stream being divided so a portion flows through each said nozzle with their streams flowing toward and meeting one another in said chamber, said body having an outlet port exiting the chamber; said outlet comprising the exit for all of the stream which entered said chamber.

2. A system according to claim 1 in which said fluid release comprises a gas/liquid separator which separates and releases the stream's liquid and the stream's gases which remain undissolved in said liquid.

3. A system according to claim 2 in which said fluid release further includes a regulator valve for the liquid stream.

4. A system according to claim 2 in which said separator is a centrifugal separator.

5. A system according to claim 1 in which said portions of said stream intersect at an included angle not larger than 90 degrees.

6. A system according to claim 1 in which said portions of said stream are axially aligned, and in which said exit port exits the chamber laterally, midway between said nozzles.

7. A system according to claim 1 in which each of said nozzles includes a converging section, and twisting vanes in said converging section whereby to impart a rotary motion to the outer region of the stream as it flows through the nozzle.

8. A system Apparatus according to claim 1 in which said reactor comprises a body having a central axis with an internal cylindrical wall forming an axial internal cylinder, its said inlet port adapted to receive said stream, and its said outlet port adapted to discharge said stream with an increased dissolved amount of said treatment gas therein, said inlet port and said outlet port being centrally located on said central axis;

a nozzle in said inlet port directing said stream axially into said cylinder;

a partial barrier extending laterally across said cylinder dividing said cylinder onto a first chamber and a second chamber, said barrier having an upstream face facing into said first chamber and axially facing said nozzle, and a downstream face facing into said second chamber and facing said outlet port;

said upstream face having a concave circular first reflecting surface centered on said central axis and facing said nozzle, the radius of said reflecting surface being smaller than the internal radius of said internal cylindrical wall;

a plurality of axially extending arcuate blades, each having an outer wall closely fitting to said internal cylindrical wall, a dimension of radial thickness, and an inner wall concentric with its said outer wall, said blades having axially-extending side walls, said blades being angularly spaced from one another to provide an equal number of axial slots between them;

a cove surface circularly surrounding said first nozzle, extending to said inner walls of the blades and to their intersections with said slots, whereby said stream discharges from said nozzle so a major portion of it strikes said reflecting surface, which reverses a major portion of the flow to the cove surface which in turn reflects a major portion of said flow toward said barrier along said blades and in said slots, said partial barrier being pierced between with slots between said slots to provide for flow from said first chamber into said second chamber, thereby to pass said flow from the first chamber into said second chamber, said outlet port discharging from said second chamber.

9. A system according to claim 8 in which said second chamber comprises a partial barrier facing toward said outlet port, a plurality of blades and slots as in said first chamber, said slots in the first and second chamber being rotationally displaced from one another, whereby to form joggle shoulders encountered by portions of the stream flowing across the barriers, said second chamber including a cove receptive of some of the flow across the barrier to reflect at least some of the flow of the stream to the barrier in said second chamber, which in turn reflects it to said outlet port.

10. A system according to claim 9 in which said fluid release comprises a gas/liquid separator which separate and releases the stream's liquid and the stream's gas a which remain undissolved in said liquid.

11. A system according to claim 10 in which said separator is a centrifugal saparator.

12. A system for accelerating the solution of treatment gas into a liquid stream, said system being adapted to receive and maintain said stream under pressure, said system comprising:

an aspirating injector comprising a body having an axial passage, a converging section, a throat section and a diverging suction in said passage in that order, an injector port through said body entering said throat section and adapted to receive treatment gas to be dissolved in said liquid stream, said passage having an inlet port to receive said stream, and an outlet port;

a collider comprising a body forming a chamber having an inlet port and an outlet port, said inlet port being connected to the outlet port of the injector, its outlet port being connected to a fluid release receiving said stream from said last mentioned outlet port for releasing the treated stream from the system while maintaining the system under pressure; said collider comprising a body forming a chamber, a pair of nozzles opposing one another, said stream being divided so a portion flows through each said nozzle with their streams flowing toward and meeting one another in said chamber, said body having an outlet port exiting the chamber, said outlet comprising the exit for all of the stream which entered said chamber.

13. A system according to claim 12 in which said portions of said stream intersect at an included angle not larger than 90 degrees.

14. A system according to claim 12 in which said portions of said stream are axially aligned, and in which said exit part exits the chamber laterally, midway between said nozzles.

15. A collider receptive of two streams of a gas/liquid stream to accelerate the solution of the gas into the liquid, said collider comprising:

a body forming a chamber, pair of nozzles opposing one another, said stream being divided so a portion flows through each said nozzle with their streams flowing toward and meeting one another in said chamber, said body having an outlet port exiting the chamber, each of said nozzles includes a converging section, and twisting vanes in said converging section whereby to impart a rotary motion to the outer region of the stream as it flows through the nozzle.

16. A collider according to claim 15 in which said portions of said stream intersect at an included angle not larger than 90 degrees.

17. A collider according to claim 15 in which said portions of said stream are axially aligned, and in which said exit port exits the chamber laterally, midway between said nozzles.

18. A reactor receptive of a stream of liquid and bubbles of treatment gas, for accelerating the solution of said gas in said liquid, said reactor comprising:

a body having a central axis with an internal cylindrical wall forming an axial internal cylinder, its said inlet port adapted to receive said stream, and its said outlet port adapted to discharge said stream with an increased dissolved amount of said treatment gas therein, said inlet port and said outlet port being centrally located on said central axis;

a nozzle in said inlet port directing said stream axially into said cylinder;

a partial barrier extending laterally across said cylinder dividing said cylinder onto a first chamber and a second chamber, said barrier having an upstream face facing into said first chamber and axially facing said nozzle, and a downstream face facing into said second chamber and facing said outlet port;

said upstream face having a concave circular first reflecting surface centered on said central axis and facing said nozzle, the radius of said reflecting surface being smaller than the internal radius of said internal cylindrical wall;

a plurality of axially extending arcuate blades, each having an outer wall closely fitting to said internal cylindrical wall, a dimension of radial thickness, and an inner wall concentric with its said outer wall, said blades having axially-extending side walls, said blades being angularly spaced from one another to provide an equal number of axial slots between them;

a cove surface circularly surrounding said first nozzle, extending to said inner walls of the blades and to their intersections with said slots, whereby said stream discharges from said nozzle so a major portion of it strikes said reflecting surface, which reverses a major portion of the flow to the cove surface which in turn reflects a major portion of said flow toward said barrier along said blades and in said slots, said partial barrier being pierced between with slots between said slots to provide for flow from said first chamber into said second chamber, thereby to pass said flow from the first chamber into said second chamber, said outlet port discharging from said second chamber.

19. A reactor according to claim 18 in which said second chamber comprises a partial barrier facing toward said outlet port, a plurality of blades and slots as in said first chamber, said slots in the first and second chamber being rotationally displaced from one another, whereby to form joggle shoulders encountered by portions of the stream flowing across the barriers, said second chamber including a cove receptive of some of the flow across the barrier to reflect at least some of the flow of the stream to the barrier in said second chamber, which in turn reflects it to said outlet port.

20. A system according to claim 12 in which each of said nozzles includes a converging section, and twisting vanes in said converging section whereby to impart a rotary motor to the outer region of the stream as it flows through the nozzle.

* * * * *